Figure 1:
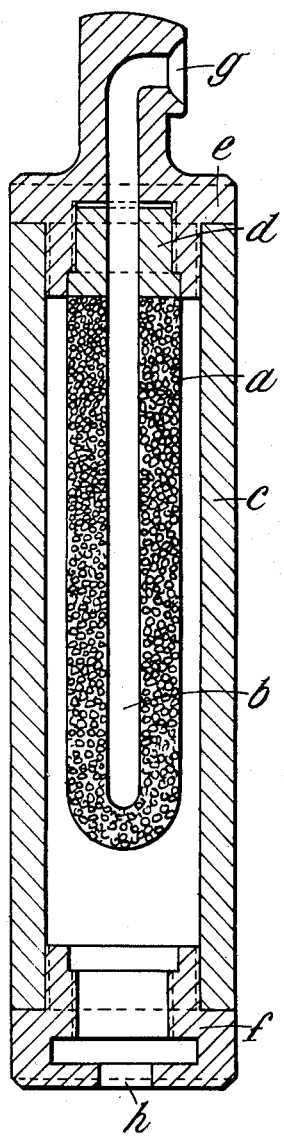

Oct. 1, 1935.                M. WILDERMAN                2,016,161
        FILTERCANDLE FOR ARTIFICIAL SILK AND PROCESS
              OF FILTERING ARTIFICIAL SILK SOLUTIONS
                      Filed Nov. 17, 1932

Inventor
Meyer Wilderman
by
Byrnes, Stebbins, Parmelee & Blenko
His Attys.

Patented Oct. 1, 1935

2,016,161

UNITED STATES PATENT OFFICE 2,016,161

FILTERCANDLE FOR ARTIFICIAL SILK AND PROCESS OF FILTERING ARTIFICIAL SILK SOLUTIONS

Meyer Wilderman, Monte Carlo, Monaco, assignor to The American Wilderman Porous Ebonite Company, Inc., Philadelphia, Pa., a corporation of Pennsylvania Application November 17, 1932, Serial No. 643,035
In Germany September 3, 1931

3 Claims. (Cl. 210—205)

For the filtration of artificial silk solution, the so-called spinning solution, filtercandles have hitherto been used in which the solution to be filtered is usually conveyed into the inner channel of a cylindric supporting body provided on its outer side with rills. This supporting body or tube is wrapped in a filtering medium consisting of cotton wool or the like kept in position by a bag of some fine tissue. The spinning solution passes through the filtering medium which retains any impurities and runs off at the bottom of the outer tube.

The disadvantage of this arrangement was that for cleaning the filtercandle the inner tube had to be unscrewed in order to remove the filtering medium which had to be replaced from time to time by a new one. This was not only an expensive but also a troublesome matter because it was necessary to carefully tie the filtering medium and its wrapping at both ends of the supporting tube in order to prevent any of the unfiltered solution from running out with the filtrate. For this reason the filtrate is generally passed a second time through a filter which is inserted in the run of tube before the jets.

Other types of filtercandles have been tried, but they were unsuitable as they easily broke or had too small a filtering capacity or could not successfully be adapted for the purpose.

The present invention eliminates all these inconvenients by creating a filtercandle which is characterized by the use of a homogeneous micro- or macroporous body made of porous ebonite or a material of similar properties. With such filtercandles the following important characteristics are simultaneously realized.

1. It is unnecessary to use any filtercloth or other filtering medium which must be renewed from time to time. Mixing of the solution to be filtered with the filtrate is avoided. The filtering process is simplified, is cheaper and is more reliable.

2. These filtercandles have a very long life. They can be produced in any shape, form and size so that any desired quantity of solution to be filtered can be handled in a given unit of time.

3. The filtercandles can be produced of any desired porosity so as to adapt them to the special conditions and properties of the solution to be filtered.

4. The filtercandles can be provided with supporting ribs in order to work, if desired, at higher filtering pressures and/or higher back washing pressures, and, if necessary, at higher temperatures.

5. The porous filter can be cleaned by back washing so as to be used over and over again, and its life is as mentioned a very long one.

6. Both operations of filtering and backwashing can be carried out in the same apparatus.

Such filtercandles are operated by conveying the solution to be filtered from one or both ends through the inner bore of the porous body, the solution issuing after depositing all impurities on the porous body, at its outer surface; or the solution to be filtered enters the porous body from the outer side, passes through it, and issues clean into the inner bore from which it runs off at one or both ends.

Such filtercandles can be cleaned very easily. The bore of the inner cylinder can be cleaned by spraying washing liquid from spray tubes introduced into one or both ends of the bore. The bore may be cleaned of solid matter by backwashing from the exterior of the inner cylinder. That is, washing liquid may be forced from the outside of the inner cylinder to the bore so as to remove the solid material from the bore. In the backwashing operation, the washing liquid flows in the opposite direction to that in which the solution to be filtered flows during the filtering operation. The use of expensive filtering material as hitherto employed is avoided in the present invention either in the case where backwashing is used or in the case where spray tubes are employed.

In the filtering operation, it is preferred to pass the solution to be filtered from the outside of the inner filtering cylinder to the bore within the cylinder so as to deposit the solid material on the outer surface of the inner filtering cylinder. The deposited material can be washed more easily from the outer surface than from the bore of the filtering cylinder. The outer surface of the filtering cylinder has a greater area than the surface area of the bore and therefore a given amount of solids can be deposited on the outer surface for the same thickness of deposit. Since the filtering pressure employed depends somewhat upon the thickness of the deposit, it is an advantage to have a thin deposit only so that it will not be necessary to use excessive pressures. Furthermore, when filtering from the outside in is employed, the filtering cylinder is under compression, whereas when filtering from the inside out is employed, the filtering cylinder is under tension, and the use of too great pressures might break the cylinder. Porous ebonite cylinders have greater resistance to compression than to tension, so that it is advisable to carry out the filtering operation from the outside in.

Having thus enumerated the principal features and advantages of the new type of filtercandle given by the present invention a filtercandle is described by way of example in which the filtering medium consists of a compact porous filtering body having the shape of a hollow cylinder, closed at one end and fixed at the other end within an outer hollow cylinder leaving a free space between the two.

This arrangement gives easy access to the filtering body itself, it being proposed as a characteristic part of the invention to close the outer cylinder at both ends by screw head pieces of which one, as may be desired, carries the filtering body.

According to whether the filtering cylinder is fixed in one or the other screw head piece of the outer cylinder either the inner bore or space of the inner filtering cylinder is connected with the inlet for the solution to be filtered whilst the outer cylinder is connected with the outlet of the filtered solution; or the outer cylinder is connected with the inlet of the solution to be filtered and the inner bore or space of the inner filtering cylinder is connected with the outlet of the filtered solution.

In the accompanying drawing, which illustrates several embodiments of my invention, Figure 1 is a vertical section through a filtercandle. In this embodiment, the inlet for the solution to be filtered communicates with the interior of the filtering cylinder and the outlet for the filtrate communicates with the space between the inner filtering cylinder and the outer cylinder.

Figure 2:
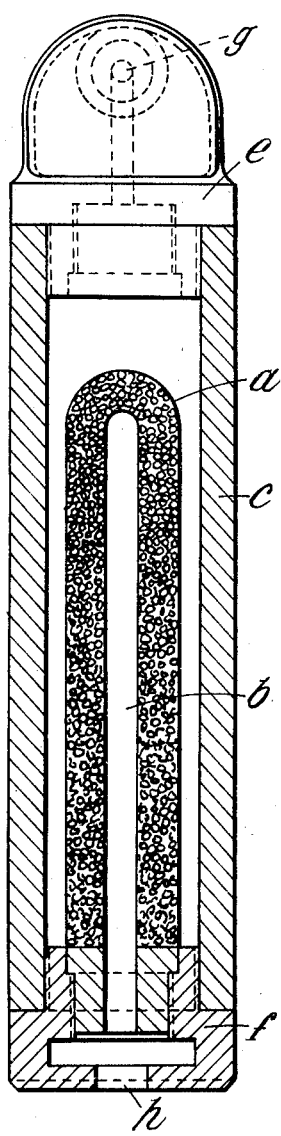
Figure 3:
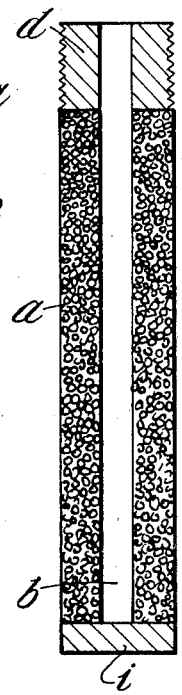

Figure 2 is a vertical section similar to Figure 1 in which the inlet for the solution to be filtered communicates with the space between the filtering cylinder and the outer cylinder, and the outlet for the filtrate communicates with the interior of the filtering cylinder, and Figure 3 is a vertical section through a filtering cylinder in which the closed end of the cylinder is made of a non-porous material such as non-porous ebonite.

In Fig. 1 the filtering body, preferably made of porous ebonite, is indicated by (a), its inner bore by (b). It is placed at a distance from the outer cylinder (c) and its one end (d), made of non-porous ebonite is screwed into headpiece (e), which, as well as headpiece (f), closes the hollow cylinder (c) at both ends. The solution to be filtered enters at (g), deposits all impurities within the bore (b), passes through the filtering body (a) and issues at (h). The porous filtering body can be closed up at its ends by non-porous ebonite i, as shown in Figure 3. The non-porous ebonite i produces more uniform filtering and backwashing throughout the remaining surfaces of the cylinder a.

For cleaning the apparatus either the bore (b) can be washed out directly or backwashed under pressure, the whole apparatus being easily unscrewed for the purpose.

In the embodiment shown in Fig. 2 the same constructive parts are used, but here the filtering body (a) is not screwed into headpiece (e) but into headpiece (f). The solution to be filtered enters at (g), passes through the filtering body from the outside to the bore b, deposits all impurities on its outer surface and issues at (h).

In this case the cleaning may be done by simply rinsing the outer surface of the filtering cylinder a. The cleaning may, however, be done by backwashing, in which case washing liquid is introduced through opening h, passes through the filtering cylinder a and removes the deposit from the outer surface of the filtering body, the washing liquid flowing out through opening g.

Having now particularly described and ascertained the nature of my invention and in what manner the same is to be performed, I declare that what I claim is:

1. In the process of filtering artificial silk solutions, the step comprising passing the solution through a porous ebonite filter medium to purify the same.

2. The process of filtering artificial silk solutions, which comprises supplying the solution to a surface of a hollow porous ebonite filtering body to deposit solid material thereon, removing the filtrate from another surface of said body, and backwashing to remove the deposited solid material by passing washing liquid through said body in the opposite direction.

3. The process of filtering artificial silk solutions, which comprises supplying the solution to be filtered to the outer surface of a hollow porous ebonite filtering body to deposit solid material thereon, removing the filtrate from the space within the filtering body, and backwashing to remove the deposited solid material by passing washing liquid through said body in the opposite direction.

MEYER WILDERMAN.